May 20, 1969    J. A. NORTHUP, JR    3,444,560
ADJUSTABLE HEADBAND
Filed July 14, 1967
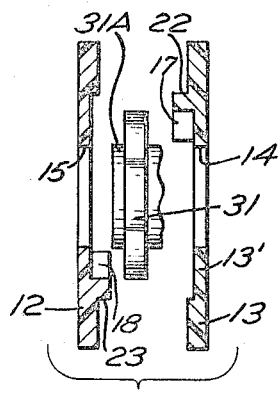
FIG. 5
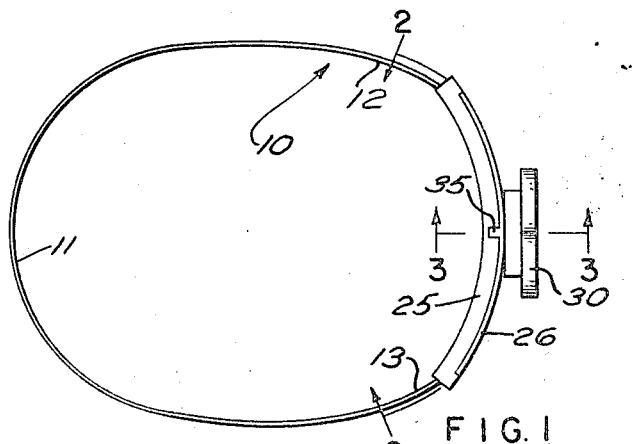
FIG. 1
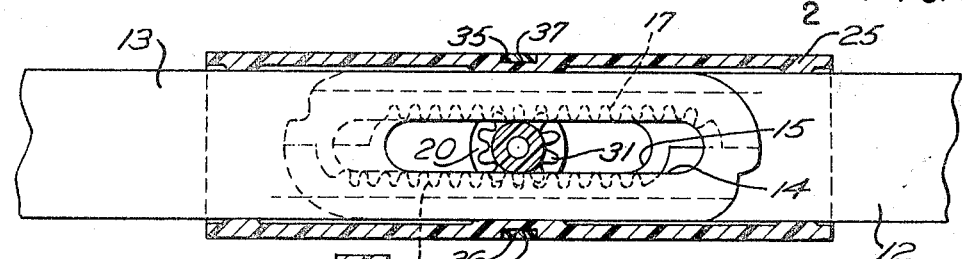
FIG. 2
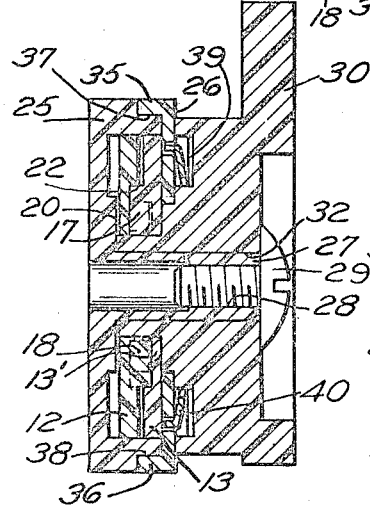
FIG. 3
FIG. 4
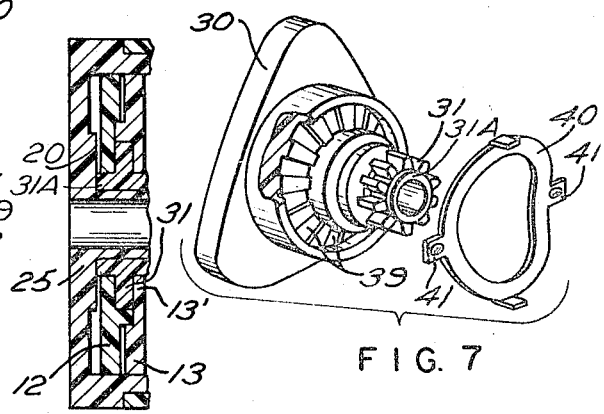
FIG. 7
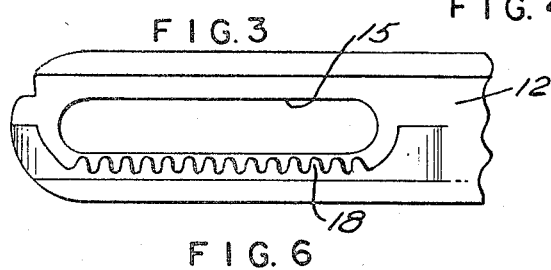
FIG. 6
INVENTOR.
JOSEPH A. NORTHUP, JR.
BY
*Barlow & Barlow*
ATTORNEYS United States Patent Office 3,444,560
Patented May 20, 1969

3,444,560
ADJUSTABLE HEADBAND
Joseph A. Northup, Jr., Riverside, R.I., assignor to Welsh Manufacturing Company, a corporation of Rhode Island
Filed July 14, 1967, Ser. No. 653,391
Int. Cl. A42b 1/00, 1/02
U.S. Cl. 2—8                                                3 Claims

ABSTRACT OF THE DISCLOSURE

A continuously adjustable headband with overlapping end portions having rack teeth for shifting the ends of the band relative to each other and thereby vary the size of the entire headband. The headband is slotted at both ends. The rack teeth are formed adjacent an edge of each slot so that the rack teeth face each other. A spur gear which is larger in diameter than the width of the slots is used to adjust the headband. A channel receives the overlapping ends of the headband. A cover having angularly extending lugs prevents the channel from spreading.

Background of the invention

Welders' helmets and the like contain a headband of an adjustable type that encircles the head and frequently have associated therewith a head crown strap. It is common to provide these headbands with adjustment features so that they may be readily adapted to various size heads, which adjustment is secured with opposed rack elements on the ends of the headband that engage a spur gear attached to a knob. A casing is fitted around this structure in such a way that the adjusting knob that contains the spur gear will move the ends of the headband with the rack teeth relative to each other. It is common to have these headbands made out of plastic material and due to a variety of factors such as sticking of the plastic parts considerable stress is sometimes placed on the rack teeth causing stripping thereof and the necessity of discarding the entire headband and suspension. It is often quite difficult to assemble headbands of the above described construction since in many cases the casing into which the ends of the headband extend for adjustment purposes are hollow tubes which make assembly extremely difficult. This invention is an improvement over the headband assembly disclosed in the Lindblom Patent 3,075,201 which is a typical example of a headband assembly made in accordance with the foregoing discussion.

Summary of the invention

An adjustable headband is constructed with a head encircling band having two end portions which have overlapping ends, each of the overlapping ends including a slot and a tooth rack which rack is superimposed on the end portion outwardly of the edge of the slot so as to have a body thickness greater than the thickness of the headband end element. The two ends of the headband are inserted into a channel which provides mounting means for a spur gear that engages each of the toothed racks on the ends of the headband. To retain the two ends of the headband in position, a cover is provided for the channel, which is a separate member and may be removable and this cover is retained in position on the channel by any suitable means, the cover also serving to prevent the channel from spreading outwardly by having depending lugs to maintain the channel in proper lateral position. Resilient means are arranged between the knob associated with the spur gear and the cover for the channel so that the rack may be restrained from movement except when a sufficient force is exerted on the knob associated with the spur gear.

Description of the drawings

FIG. 1 is a top plan view of adjustable headband embodying the principles of this invention;

FIG. 2 is a sectional view taken longitudinally through the adjustment assembly substantially on lines 2—2 of FIG. 1;

FIG. 3 is a sectional view taken on substantially lines 3—3 of FIG. 1;

FIG. 4 is another sectional view just slightly removed from the section of FIG. 3 showing the spur gear in another position;

FIG. 5 is a detached sectional view showing a portion of the adjusting mechanism particularly the racks and teeth thereof on each end of the respective headband units together with the spur gear for engaging the rack teeth;

FIG. 6 is a plan view of one end of the headband strap; and

FIG. 7 is an exploded perspective view showing the adjusting knob and detent spring.

Description of the preferred embodiment of the invention

The headband assembly which is shown in FIG. 1 is generally designated 10 and consists of a head encircling band comprising a front portion 11 for extending around the forward part of the head and a rear portion designated 12 and 13 which may be separate from the front portion 11, if, for example, the headband assembly takes the form as shown in United States Patent 3,075,201 where a crown strap is illustrated. The end portions of the two parts 12 and 13 are slotted and referring to FIG. 6 which shows the construction of the part 12, a slot 15 is provided therein and to one edge of the longitudinal extent of the slot 15 there are provided a number of rack teeth 18 that are superimposed on the inner face of the end of the headband shown more particularly in FIG. 5. An identical structure is provided for the end 13 which has a slot 14 and a number of rack teeth 17 superimposed thereon as illustrated in FIG. 5. This arrangement is shown more particularly in FIG. 3 of the drawings where the parts are shown in superimposed relationship. It will therefore be apparent how the two ends 12 and 13 remain in sliding relationship with each other and to maintain them in nesting relationship they are received in an arcuate channel 25 which has a cover plate 26 suitably secured thereto. The channel 25 is open ended and has a hollow cylindrical stud 27 (see FIG. 3) extending from a central raised portion 20 thereof. The stud 27 may have a threaded bore section 28 into which a screw 29 may be received or a self-tapping screw may be used. An adjusting knob 30 has a spur gear with teeth 31 shown as being integral therewith and the entire assembly has a bearing aperture 32 which permits the adjusting knob to be rotatably received on the stud 27. The spur gear teeth 31 mesh with the rack teeth 17 and 18 when the end portions 12 and 13 are in overlapping relationship, and the gear 31 is of a diameter greater than the width of the slots 14, 15 so as to be physically retained between the two overlapping end portions of the headband. It will further be noted that just behind the spur gear an undercut or a groove is provided for the reception of a portion of the body of the strap 13 and more particularly one longitudinal edge thereof as designated by the numeral 13' (see FIGS. 3 and 4). Adjacent the gear is a spacer boss 31A and the slot 15 in the body of the end portion 12 is received about the spacer boss 31A. In this way a positive location of the spur gear is always had once the ends 12 and 13 are in abutting relationship or substantially so and further planar alignment of end portions is maintained by the grasping of end 13 and abutment of end 12 between portion 20 and the face of gear 31. The cover plate 26 is provided substantially centrally thereof with two right angular flange portions 35, 36 which are received in recesses 37, 38 in the channel 25. In this fashion the cover plate prevents the side walls of the channel from bulging outwardly during use of the adjustment device. On the underside of the adjustment knob 30 there are circularly arranged a number of recesses 39 and between the cover plate 26 and the underside of the knob 30 there is mounted a metal spring washer 40 in a manner similar to that shown in Patent 3,075,201 so that the free arms 41 thereof will engage the recesses 39 and hold the knob in position to which it has been rotated. It will therefore be apparent that turning the knob 30 in one direction will expand the encircling headband while turning the knob in the opposite direction will contract the headband.

Thus it will be seen that I have provided an efficient headband adjusting assembly which provides great strength of rack teeth on the ends of the headband by having the rack teeth effectively protrude from the surface of the band to give them great strength and to avoid stripping of the rack teeth which has been a problem with the constructions known in the prior art.

I claim:

1. An adjustable headband having two overlapping parts with elongated registering slots, a channel generally rectangular in cross section receiving said overlapping parts, rack teeth formed adjacent the edge of one slot on the surface of the headband facing rack teeth adjacent the edge of the other slot, an adjusting knob having a spur gear meshing with said opposite rack teeth, said spur gear having a diameter greater than the width of said slots whereby said spur gear is physically retained between the two overlapping parts of the headband and means passing through said registering slots for rotatably holding said knob in position relative to said channel.

2. An adjustable headband having two overlapping parts with elongated registering slots, a channel generally rectangular in cross section receiving said overlapping parts, rack teeth formed adjacent the edge of one slot on the surface of the headband facing rack teeth adjacent the edge of the other slot, an adjusting knob having a spur gear meshing with said opposite rack teeth, and means passing through said registering slots for rotatably holding said knob in position relative to said channel and a cover member provided for said channel member, said cover member having angularly extending lugs engaging upstanding side walls of said channel member to prevent spreading thereof.

3. An adjustable headband as in claim 2 wherein said adjusting knob has a plurality of radially extending recesses on the undersurface thereof facing said cover portion and a spring washer with detent arms extends between said cover portion and the underside of said knob, the detent arms of said washer engaging said recesses to hold said knob in adjusted position.

References Cited
UNITED STATES PATENTS 3,041,622    7/1962    Gurtowski _____ 2—8
3,090,046    5/1963    Bowers _____ 2—8

JAMES R. BOLER, *Primary Examiner.*